Figure 2:
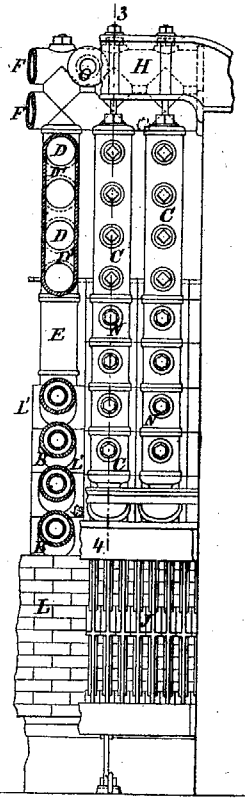

G. H. BABCOCK & S. WILCOX.

Improvement in Steam Generators.

No. 4,512. Reissued August 15, 1871.

Witnesses,

C. C. Livings

A. Hoermann.

Inventors,

G. H. Babcock S. Wilcox by their attorney C. E. Stetson

THE NORRIS PETERS CO., PHOTO-LITHO., WASHINGTON, D. C.

UNITED STATES PATENT OFFICE.

GEORGE H. BABCOCK AND STEPHEN WILCOX, OF NEW YORK, N. Y., ASSIGNORS TO GEORGE H. BABCOCK AND JOSEPH P. MANTON.

IMPROVEMENT IN STEAM-GENERATORS.

Specification forming part of Letters Patent No. 65,042, dated May 28, 1867; reissue No. 4,512, dated August 15, 1871.

*To all whom it may concern:*

Be it known that we, GEORGE H. BABCOCK and STEPHEN WILCOX, both of the city and county of New York, in the State of New York, have invented certain new and useful Improvements in Steam-Generators; and we do hereby declare that the following specification, taken in connection with the drawing making a part of the same, is a full, clear, and exact description thereof.

We will first proceed to describe what we consider the best means of carrying out our invention, and will afterward designate the points which we believe to be new therein.

The accompanying drawing forms a part of this specification.

Similar letters of reference indicate like parts in all the figures.

Figure 1:
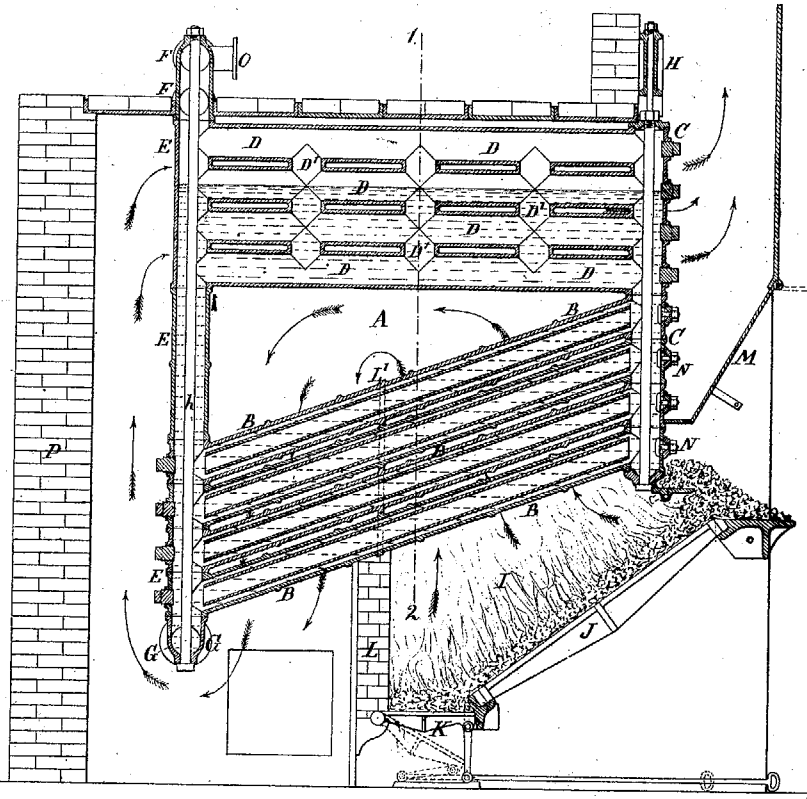

Figure 1 is a longitudinal vertical section of the apparatus in a plane through the line 3 4 of Fig. 2. Fig. 2 is partly a front elevation and partly a transverse section in a plane through the line 1 2 of Fig. 1.

The apparatus herein described belongs to that class of steam-boilers whose peculiarity is that in them water, during its conversion into steam, instead of being confined in one mass, as in the common steam-boilers, is contained in a number of vessels of small capacity, independent of each other, in this, that each vessel is distinct in itself, but connected together for the purpose of aggregating the power of the steam which is developed in each. The great capacity of steam-generators of this class to resist the explosive forces liable to be developed in any one of the several vessels, the certainty that no widespread destruction can ensue in case rupture in any one vessel occurs, and the economy of their construction, from the fact that cast-iron can be safely employed to compose the generating compartments, give to them manifest advantage in these particulars over the various kinds of single-shell wrought-iron boilers in common use. On the other hand, the deficient circulating capacity of this class of generators, the difficulty of removing incrustations from the interior of the generating vessels, which deposits are increased by a sluggish circulation of the water and a want of economy in the application of the heat of the furnace to the fire-surface to be acted upon, are disadvantages which go far to counterbalance the good capacities mentioned. Our invention seeks to remedy these defects, and to combine in one apparatus for producing steam the advantages and conveniences which belong to generators of both the above-named classes.

In the accompanying drawing there is exhibited, in Fig. 1, one section of the generator, and in Fig. 2 there are seen several of such sections united. Each section is composed of four sets of pipes or slender vessels, say of about five inches diameter, one of which sets is in a horizontal position, another is inclined at an angle therewith, and the third and fourth form connections between the ends. The space A so formed between these sets of pipes constitutes a chamber for the combustion of the gases of the fuel used in the furnace. The drawing exhibits these pipes in sets of four, which number may be increased or diminished, to suit the judgment of the constructor. Each of the pipes B B composing the series, which is inclined, is cast separately, and made with a T-head cast with the pipes in a position just sufficiently oblique thereto so that when the several pipes of the series are placed one above the other, as shown at Fig. 1, such heads will constitute integral parts of continuous side pipes C and E. In this way a joint at the junction with the side pipe is not only avoided altogether, but a manifest advantage is obtained in the facility with which the several pipes can, as will presently be seen, be clamped together to form a united structure. These T-heads should be milled or brought to a true face upon their edges, which may be flanched or not. They allow of being tightly fitted together at the joint. Each one of the pipes of this series is also provided at a proper point in its length with square flanches L′ oblique to its axis, of such size that when the several pipes of each section and the several sections of pipes are arranged in order such flanches will constitute a continuous transverse partition, which forms the upper portion of the back wall or bridge-wall of the fire-chamber. The series of horizontal pipes or vessels D belonging to each section is made in one casting, and is connected together at several points by the perpendicular short connections D′, as shown. Each section of pipes B C D E to compose the generator being fitted, as exhibited in Fig. 1, and an intermediate upright piece of pipe applied so as to make a connection at the rear end between the set of inclined and the set of horizontal pipes, which entire connection is marked E, the generator is ready to be put together. The several sections are now to be put up, as shown in Fig. 1, and the sections arranged side by side until the desired capacity is obtained. The sections are connected together at the bottom by a transverse pipe, G G, and at the top by one or more transverse pipes, F, Fig. 1, provided with nozzles corresponding in size and distance from each other with the ends of the rear connections E. These transverse connecting-pipes F and G are secured to the several sections by rods *h h*, which pass through them and the axes of the side pipes, and are provided with nuts at their ends for clamping the structure together. Similar clamp-rods are also employed to tie together the several pipes of each section at their front ends, which rods, at their upper ends, pass through and are sustained by a cross-beam or yoke, H, Fig. 2. I is the furnace, having a bridge-wall, L, a hinged ash-grate, K, and a stationary inclined grate, J, the coals being fed through the opening, as represented. As the spaces between the sections of pipes constitute the flues, it will be seen that the flames and combustible gases pass, as indicated by the arrows, first upward through the spaces between the pipes of the inclined series B into the combustion-chamber A; thence backward over the partition-wall formed by the flanches L′, already described; thence downward through the spaces between the pipes B, and then backward to escape under the boiler transverse pipe G, (this being the only outlet from the combustion-chamber.) Side flanches or longitudinal pins are formed or cast upon each of the upright pipes or vessels C and E, extending as far as the junction thereof, with the lowest pipe of the top connection or horizontal series D, as well as above the sides of this said lowest pipe D, so that when the several sections are arranged side by side there is formed a continuous partition wherever the edges of such pins abut.

The smoke and products of combustion, having passed upward, backward, and downward through the spaces, as indicated, enter the space between the generator and the brick wall P in the back of the chamber in which the same are set, and, passing upward along the back side of the side pipes E, move forward through the spaces between the series of horizontal pipes D to the front of the generator, whence they escape by suitable flues into the chimney, not represented.

It will be readily understood that, aside from the incidental formation of a combustion-chamber, A, the arrangement of the entire series of inclined and horizontal pipes and connections accomplishes the following important effects to aid in maintaining in one direction throughout the generator a constant circulation of the water: The temperature of the water in that portion of the series of inclined pipes which projects beyond the line of the rear wall of the fire-chamber is necessarily lower than the temperature of the water in that portion of the pipes directly over the furnace. Also, this difference in temperature is increased and the water is more dense and free from steam from the circumstance that the feed-water is admitted through the pipe G and E, and passes directly from the side pipes E into the series of inclined pipes B, and thence through the upright vessels C into the series of horizontal pipes or top connection D, and never in the reverse direction. As the steam disengages itself from the water it will pass upward through the cross-connecting passages D′ of the horizontal series, and, seeking the highest point, enter the transverse pipe F and be delivered at the nozzle O; and thus a constant and complete circulation of water throughout the generator in one direction will be always maintained, while the steam will be freed therefrom so soon as formed, and pass off through the series of upright connecting-pipes D′, which should be sufficiently numerous to meet the requirements of the case.

We have introduced into each of the inclined pipes B smaller pipes, shown in section in Figs. 1 and 2, which are simply plain cylindrical pipes extending through the axis of the main pipes a portion of the distance from front to rear, and which may, in certain exigencies, have the effect here, as in other instances when they are applied, to allow the colder particles of water in the main pipes to separate from the warmer particles, and be returned through such internal pipes to the lower end of the main pipes B.

For convenience in removing any incrustation upon the inside of the pipes of both series we have provided hand-holes N at each end of the same, covered by suitable plates, which, when removed, will afford every facility for scraping out the inside of the pipes; and, to enable the flues of the horizontal series as well as these hand-holes to be conveniently reached, we construct the front of the furnace with a hinged man-hole door, M.

Some of the advantages due to certain features of our invention may be separately enumerated, as follows: First, by reason of the fact that there is no communication along the sides of the furnace, and that a free communication is provided for the water to move forward through the inclined pipes B; thence upward through the front connections C; thence backward through the horizontal pipes or vessels D, which serve as a top connection and separating-chamber; and thence downward through the back connections E, and that all of these are cylindrical and afford the maximum strength with the least material and the least frictional resistance to the water, the water is compelled by the construction and arrangement to perform this circuit actively; while, also, by the bridge L′ extending crosswise of the pipes B the hot products of combustion are caused to traverse crosswise through the spaces between the pipes B, first upward, thence backward, and then downward, we produce an unusually compact, strong, cheap, light, and efficient steam-generator. Second, by reason of the construction of the said pipes and connections in several sections, united at the ends by distinct vessels extending up and down appropriate to each section, the boiler may be conveniently increased and decreased in capacity by adding and taking from any given number of sections. The inclosed triangular space A forms a mixing-chamber, in which the gases complete their combustion. Third, by reason of our construction of the top connection D, of cast-iron, in the form of several distinct channels, one above the other, with intercommunicating passages D′ connecting them at various points in their lengths, we obtain a very efficient separation of the steam from the water with a strong form and cheap material. Fourth, by reason of our flanges L′ fixed across the tubes B, as shown, we are able to form cross-partitions by simply applying these flanged tubes together, as shown.

What we claim as our invention, and desire to secure by Letters Patent, is—

1. The within-described safety-boiler, composed of cylindrical vessels connected at the ends substantially as represented, so that the water and steam shall separate in the upper cylindrical vessels or top connection, the dense water descend and pass thence in inclined pipes through the farnace and ascend again in suitable connections at the other end, to repeat the round of circulation indefinitely, in combination with the bridge L′, as represented, for compelling the hot products of combustion to traverse upward and again downward through the interstices between the inclined pipes B, all substantially as and for the purposes herein set forth.

2. A steam-generator made up of sections of pipes, each of the several sections being composed of a series of inclined pipes, B, and a series of horizontal pipes, D, united at the ends by distinct side pipes appropriate to each section, the several sections, when arranged side by side and connected, forming an intermediate combustion-chamber, A, and operating to cause a constant circulation of the water through the pipes in one direction, substantially as described.

3. In combination with the series of horizontal pipes D, the series of upright connecting-pipes D′, for the purpose of allowing the steam, as formed, to separate from the water and rise to the discharge aperture, arranged substantially as described.

4. The flanges L′, fixed crosswise to the axes of the water-pipes B, and matched together to form partitions crossing the same, as specified.

In testimony whereof we have hereunto set our names in the presence of two subscribing witnesses.

GEO. H. BABCOCK.
STEPHEN WILCOX.

Witnesses:
THOMAS D. STETSON,
C. C. LIVINGS.